March 25, 1941. R. SERENYI ET AL 2,236,416
MANUFACTURE OF SEAMLESS HOLLOW BODIES OF PLASTIC MASSES
Filed Feb. 4, 1938 2 Sheets-Sheet 1
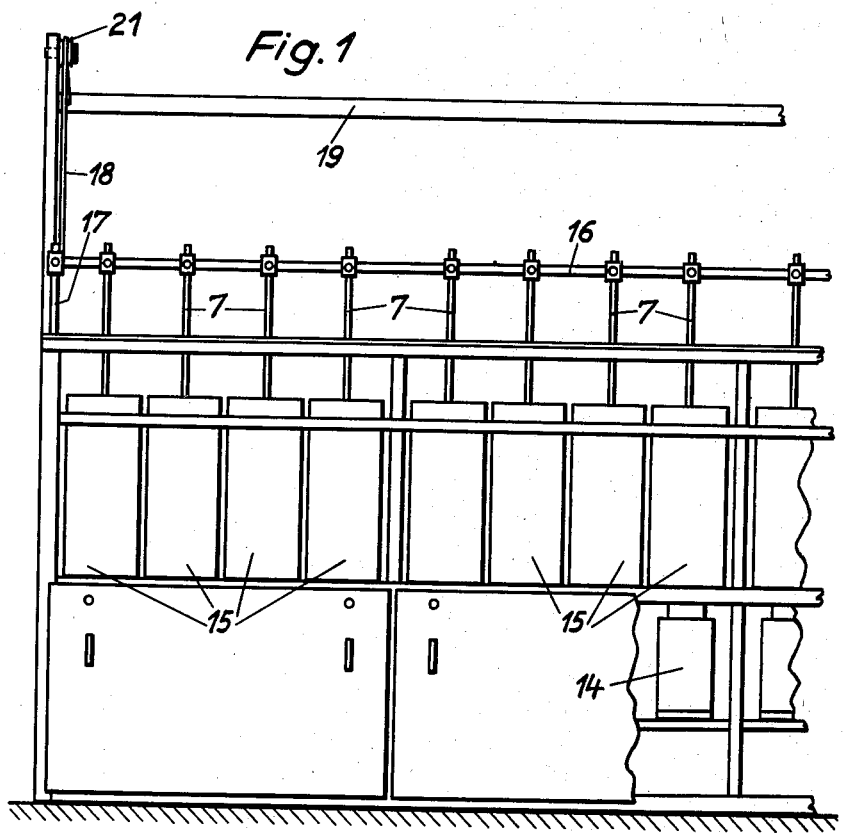
Inventors

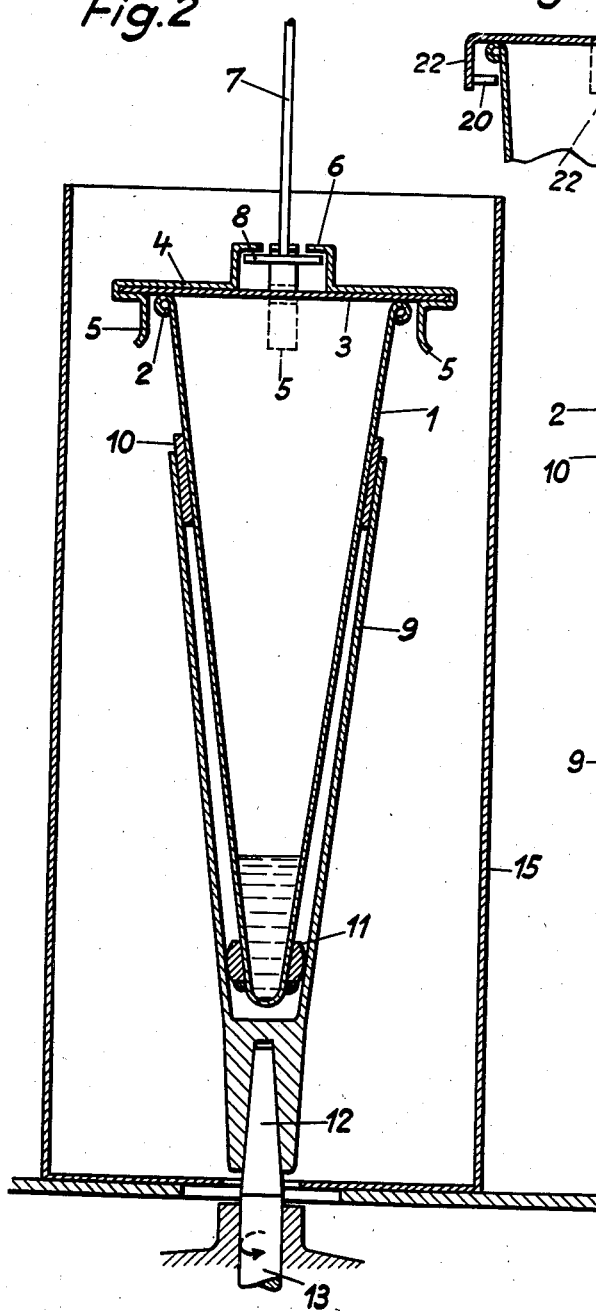
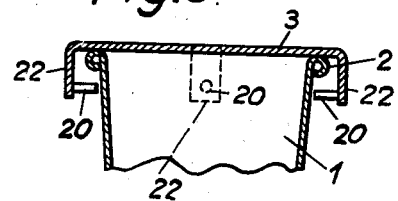
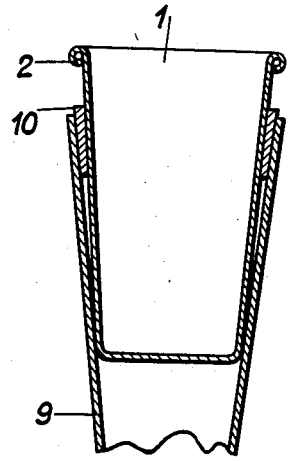

Patented Mar. 25, 1941

2,236,416

UNITED STATES PATENT OFFICE 2,236,416

MANUFACTURE OF SEAMLESS HOLLOW BODIES OF PLASTIC MASSES

Richard Serenyi and Albert Nadai, Zurich, Switzerland

Application February 4, 1938, Serial No. 188,794
In Switzerland February 12, 1937

1 Claim. (Cl. 18—55)

This invention relates to the manufacture of seamless hollow bodies of plastic masses especially from cellulose derivatives, artificial resins or the like.

The main object of the present invention is to make seamless hollow bodies with completely uniform wall thickness.

A further object of the invention is to provide means allowing the production of hollow bodies with absolutely uniform wall thickness, capable of being suitably adjusted in thickness only by varying the number of revolutions and the form of the mold.

In proceeding in accordance with the present invention the necessary quantity of a plastic mass, for instance of a thermoplastic mass, i. e. a substance capable of being liquefied by heat, a cellulose derivative or an artificial resin is poured into a mold rotatably mounted on a vertical shaft. When charging the mass to be centrifuged care must be taken that no bubbles are formed. The mold is then closed by a cover in airtight manner. The mounting of the covers is such that they can be somewhat withdrawn from the mold. The mold is now rapidly rotated with preferably 3000 to 5000 revolutions per minute. It is essential that the mold attains the said number of revolutions as rapidly as possible. The centrifugal force causes the plastic mass to creep along the walls of the preferably conically shaped mold in such a way that the said walls are covered with a uniform layer of plastic mass. The covers of the molds which are mounted so as to be withdrawn from the molds allow excess mass to escape during the centrifuging. In this manner the formation of eddies in the mold is avoided and the mass cannot accumulate under the cover. When the mass has reached the upper edge of the mold the rotation of the mold may be either stopped or instantaneously continued so as to allow an efficient drying of the mass. This drying may however also be done in a separate drying chamber of known construction. The removal of the layer formed in the mold can then be effected after a short time without trouble and without the use of a separate device.

In practice a number of molds, each of them driven by a separate motor are arranged in containers placed one beside the other.

The invention includes also a novel form of apparatus by means of which the above mentioned bodies may be made. One such apparatus is illustrated by way of example in the accompanying drawings, in which Fig. 1 is an elevation of a part of the apparatus,
Fig. 2 is a cross-section of a container containing one mold.
Fig. 3 shows another embodiment of the cover closing the mold and
Fig. 4 is a cross-section of another embodiment of the mold.

In the apparatus of which a part is shown in Figure 2 any desired number of molds 1, arranged in containers 15 may be used and placed for instance in a double row beside one another. The shape of the molds 1 which are preferably made of a light metal corresponds to the shape of the article to be manufactured. The upper edge of the mold 1 is provided with a flange 2. On flange 2 (see Figure 2) rests a cover 3 which is provided with four strips 4 of resilient steel. The lower ends 5 of the strips 4 guide the cover 3 on the edge 2 whereas the upper ends 6 are bent so as to end above disk 8 fixedly secured to a rod 7. The mold 1 is secured in a mantle 9 by means of two centering rings 10 and 11. Mantle 9 rests on the cone 12 of the vertical shaft 13 of an electromotor 14 (see Figure 1). A separate motor 14 is provided for each mold 1. As may be seen from Figure 1 all the rods 7 are secured to a bar 16 which is slidingly mounted in lateral guides 17. Bar 16 can be moved up and down by means of a counterweight 19 connected to bar 16 by means of a cable 18 which passes over a pulley 21 rotatably mounted on the guides 17. By displacing counterweight 19 bar 16 is also displaced and by an appropriate movement of the bar 16 all the covers 3 can be lifted or replaced at the same time.

It is essential that the covers 2 close the molds 1 hermetically during the rotation, so that no air whirls are formed in the mold. On the other hand the closure of the molds 1 must be such that the surplus mass can easily leave the mold so as to attain an absolutely uniform wall thickness and prevent the excess mass from accumulating under the cover 3. Such accumulated mass would flow back along the walls of the mold as soon as the rotation of the mold is stopped and the thickness of the wall would in no case be uniform. The cover which is represented in the drawings closes the mold hermetically by virtue of its weight but it can be easily lifted by the excess mass creeping along the walls during the rotation of the mold.

Figure 3 shows another embodiment of the cover 3. The cover represented in the mentioned figure is provided with four lugs 22 and horizontal pins 20 which reach as far as below the flange 2 of the mold 1. These pins prevent the cover 3 from being lifted too much by the excess mass escaping the mold. In this case each cover has to be separately put on the respective mold.

Figure 4 shows another embodiment of the mold which is secured to mantle 9 by means of a centering ring 10.

The method described may be applied to any plastic mass, for instance to thermoplastic masses, to viscose, to cellulose derivatives (cellulose ester and cellulose ether). When using viscose the precipitating agent is introduced directly into the mold which continues to revolve at a reduced speed until the precipitated viscose layer has reached the necessary consistency whereupon the layer and the precipitating agent are removed together from the mold.

A principal advantage of the present invention resides in the fact that a uniform thickness of the wall can be attained with any mass only by varying either the number of revolutions of the mold or the inclination of the walls of the said mold. This forms a considerable advantage in comparison with the methods hitherto used. According to the present invention highly concentrated masses, containing only a small part of solvent may be used which results in a gain of solvent and time because the layers formed on the walls of the molds are very rapidly dried. Of course the concentration of the mass may be varied according to the circumstances. In the hollow molds may be placed reinforcements, fabrics, grids and so forth consisting of rigid or semi-rigid material, which are then embedded in the mass covering the walls of the mold.

The method may also be used for forming in hollow bodies of any suitable material a uniform coating of a suitable mass, for instance of a cellulose derivative or an artificial resin. A number of layers of the same or of another material may be arranged one above the other. The wall of the mold and therefore the body produced in this mold may be provided with ribs, recesses, inscriptions, decorations, etc.

The machine as described above is preferably used to carry out the method as set forth in our pending application Serial No. 115,054 of December 9, 1936.

What we wish to claim and secure by U. S. Letters Patent:

In a machine for the manufacture of seamless hollow bodies from plastic masses, a rotatable vertical shaft, a mantle mounted on the shaft coaxially therewith, a mold held in said mantle by gravity, upper and lower spacing rings between the outer wall of the mold and the inner wall of the mantle, a cover for said mold lying lightly on the upper edge of the mold to exclude air and being free to be moved up with respect to the mold under the influence of the moldable substances within the mold to permit escape of excess material, and means to guide the cover in its movements over the mold.

RICHARD SERENYI.
ALBERT NADAI.